United States Patent
Lee

(10) Patent No.: US 6,589,624 B1
(45) Date of Patent: Jul. 8, 2003

(54) CARD WITH REMOVABLE STICKERS

(75) Inventor: Shih Feng Lee, Taipei (TW)

(73) Assignee: Jeng Yair Label Print Co., Ltd., Taipei Hsien (TW)

(*) Notice: Subject to any disclaimer, the term of this patent is extended or adjusted under 35 U.S.C. 154(b) by 0 days.

(21) Appl. No.: 10/054,930

(22) Filed: Jan. 25, 2002

(51) Int. Cl.⁷ ................................ B32B 9/00
(52) U.S. Cl. ................ 428/40.1; 40/124.191; 283/81; 283/98; 283/101; 428/40.9; 428/41.2; 428/41.6; 428/41.7; 428/41.8; 428/41.9; 428/42.1; 428/42.2; 428/42.3; 428/914
(58) Field of Search ............... 428/40.1, 40.9, 428/41.2, 41.6, 41.7, 41.8, 41.9, 42.1, 42.2, 42.3, 914; 283/81, 98, 101; 40/124.191

(56) References Cited

U.S. PATENT DOCUMENTS 4,911,477 A * 3/1990 Shishido ............... 283/81
5,295,695 A * 3/1994 Tamanini ............... 283/81
5,829,790 A * 11/1998 Phillips ............... 283/81

FOREIGN PATENT DOCUMENTS

DE   29700176 U1 * 2/1997

* cited by examiner

Primary Examiner—Nasser Ahmad
(74) Attorney, Agent, or Firm—Leong C. Lei

(57) ABSTRACT

A card with removable stickers includes a sticker assembly including a first layer of small stickers on which are printed different pictures and are cut to facilitate their removal, a second layer of backing paper having a back side which is colored with an opaque, reflective, copper-colored material, a third layer of adhesive, a fourth layer of double-sided release paper, a fifth layer of removable film made of transparent resin, and a sixth layer of adhesive, and a card adhered to the six layer of adhesive, whereby when in use, the backing paper is first removed, and then the double-sided release paper is removed from the transparent removable film leaving the transparent removable film on the card, thereby enabling illustration of the card to be completely seen and the stickers be adhered on the removable film, and writing can also be done on the film.

1 Claim, 4 Drawing Sheets

CARD WITH REMOVABLE STICKERS

BACKGROUND OF THE INVENTION

1. Field of the Invention

This invention is related to an improved structure of a combined card with stickers, and in particular to one for greeting cards, postcards or photograph-sticking paper and writing cards.

2. Description of the Prior Art

Generally only a portion of the postcard, greeting card or photograph can be written on, because of the special printing treatment the illustration portion thereby decreasing the practicality of such items. The sticker is generally cut after printing and when in use, the sticker is removed to adhere on any design position of a card. The sticker and the card are separately manufactured, packaged, and sold, and so the sticker itself does not have any additional function.

Therefore, it is the primary object of the present invention to provide an improved structure of a combined card and sticker, wherein the sticker can be removed from the card and adhered on any desired position of the card, and the card can be written on.

SUMMARY OF THE INVENTION

This invention is related to an improved structure of a combined card with stickers, and in particular to one for greeting cards, postcards or photograph-sticking paper and writing cards.

It is the primary object of the present invention to provide an improved combined card with removable stickers wherein the stickers can be removed from the card and adhered on any desired position of the card, and the card can be written on.

According to a preferred embodiment of the present invention, a card with removable stickers includes a sticker assembly includes a first layer of small stickers on which are printed different pictures and are cut to facilitate their removal, a second layer of backing paper having a back side which is colored with an opaque, reflective, copper-colored material, a third layer of adhesive, a fourth layer of double-sided release paper, a fifth layer of removable film made of transparent resin, and a sixth layer of adhesive, and a card adhered to the six layer of adhesive, whereby when in use, the backing paper is first removed, and then the double-sided release paper is removed from the transparent removable film leaving the transparent removable film on the card, thereby enabling illustration of the card to be completely seen and the stickers be adhered on the removable film, and writing can also be done on the film.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE INVENTION

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
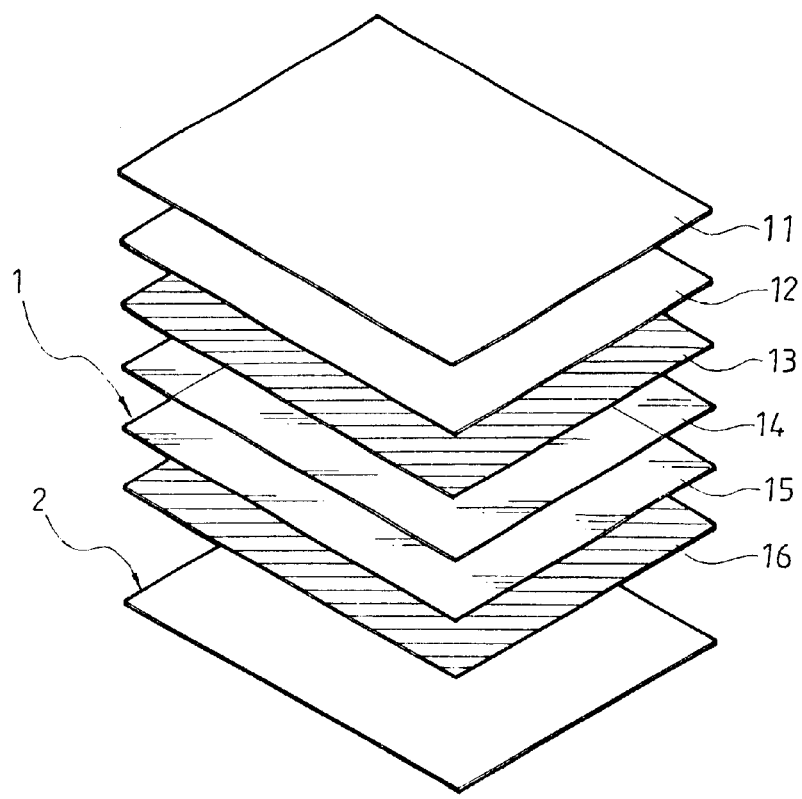
FIG. 1 is an exploded view of the present invention.
Figure 2:
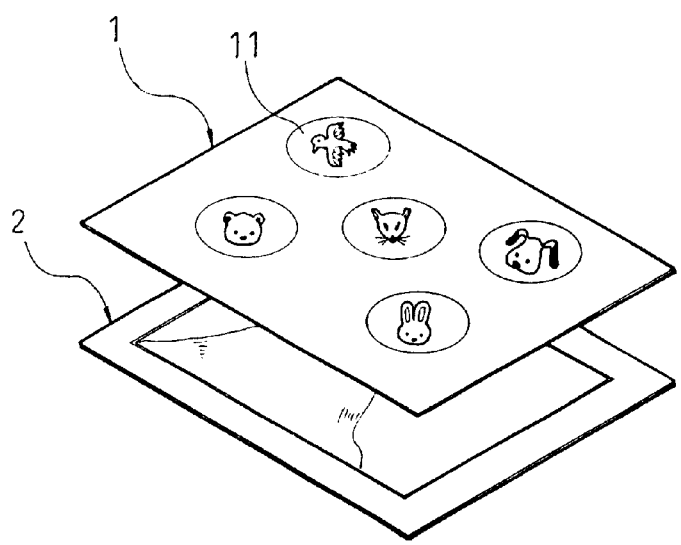
FIG. 2 shows the assembly of the sticker and the card portion of the present invention.

Referring to FIGS. 1 and 2, the present invention generally comprises a sticker assembly 1 and a card 2 wherein the sticker assembly 1 is made of different layers of materials.

The sticker assembly 1 of the present invention comprises the following elements:

1. A first layer of small stickers 11 on which are printed different pictures are cut to facilitate their removal.
2. A second layer of backing paper 12, having a back side which is colored with an opaque, reflective, copper-colored or other-colored material;
3. A third layer of adhesive 13;
4. A fourth layer of double-sided release paper 14, which can be transparent or opaque;
5. A fifth layer of removable film 15 which is made of transparent resin;
6. A sixth layer of adhesive 16.

The card 2 may be a postcard, greeting card or photograph. The sticker assembly 1 is adhered to the surface of the card 2. As required, a release paper 17 can be mounted between the bottom of the sticker assembly 1 and the card 2. As the back side of the backing paper 12 has a reflective, opaque copper color, so the pattern on the card cannot be seen.

Figure 3:
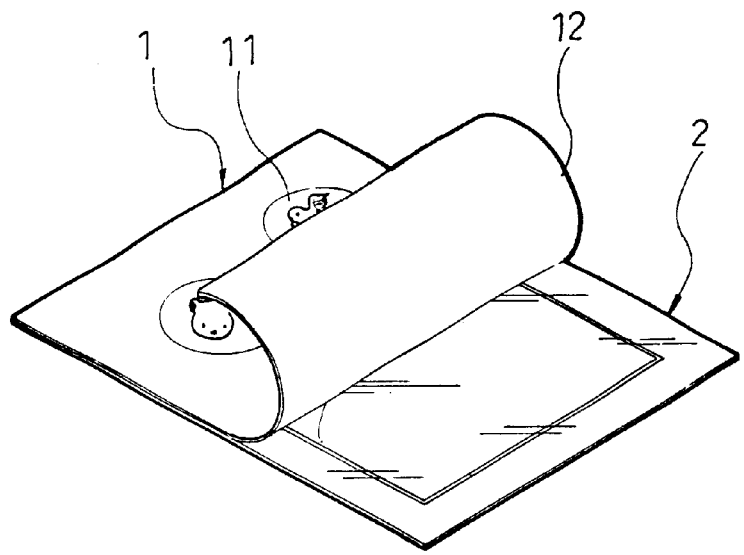
FIG. 3 shows the removal of the backing paper.
Figure 4:
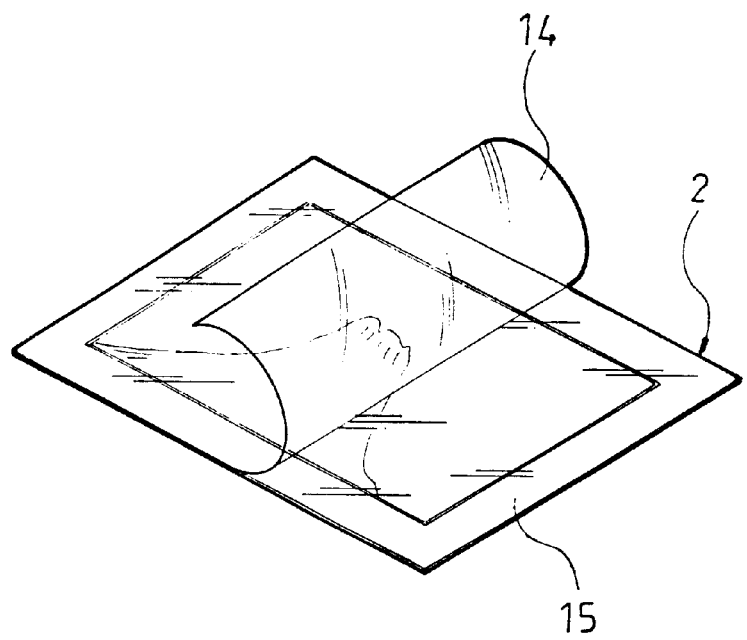
FIG. 4 illustrates the removal of the double-sided release paper.

Referring to FIGS. 3 and 4, when in use, the user may remove the backing paper 12, then the double-sided release paper 14 is removed from the removable film 15 leaving the transparent removable film 15 on the card 2. As a result, the illustration of the card 2 can be completely seen and stickers can be adhered on the removable film, and writing can also be done on the film.

Figure 5:
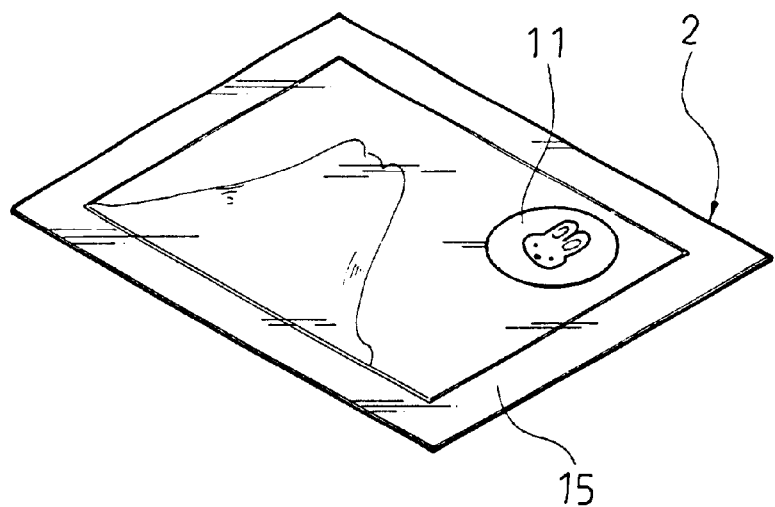
FIG. 5 illustrates the adhesion of the sticker on the card.
Figure 6:
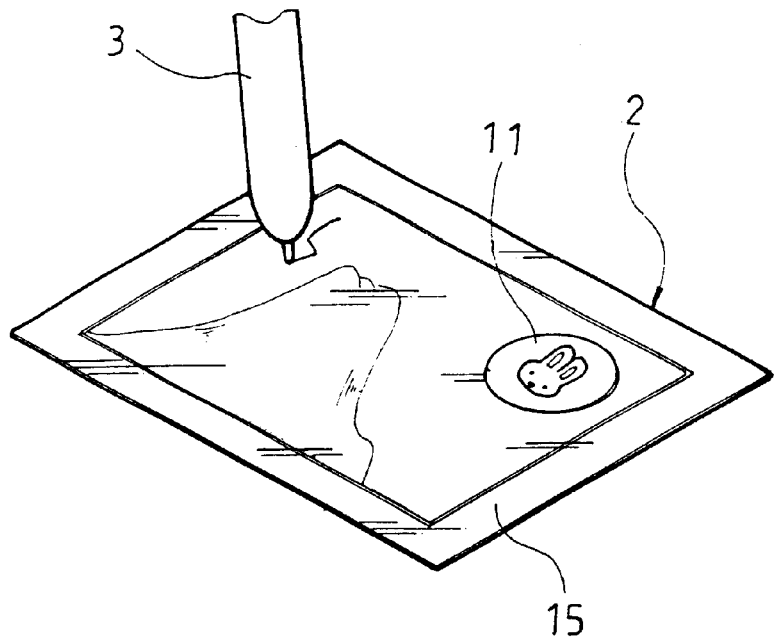
FIG. 6 illustrates how to write on the card.
Figure 7:
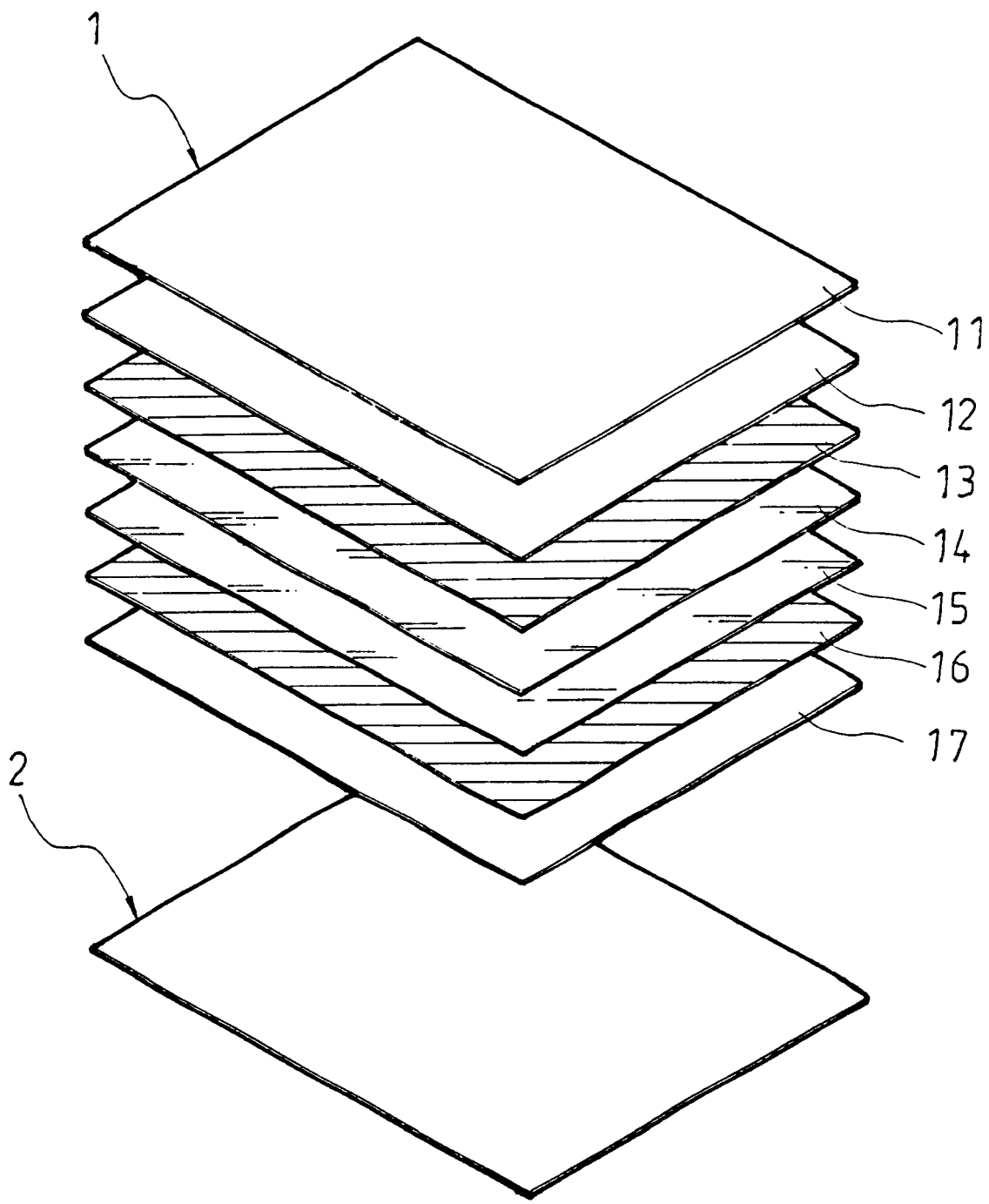
FIG. 7 illustrates a second preferred embodiment of the present invention.

Referring to FIGS. 5 and 6, after the double-sided release paper 14 is removed from the card 2, only the removable film 15 is left on the card 2. As the removable film 15 is made of transparent resin, the user may adhere the stickers 11 on the removable film and can write something on the card 2 by any writing implement 3.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A card with removable stickers comprising:

a sticker assembly including a first layer of small stickers on which are printed different pictures and are cut to facilitate their removal, a second layer of backing paper having a back side which is colored with an opaque, reflective, copper-colored material, a third layer of adhesive, a fourth layer of double-sided release paper, a fifth layer of removable film made of transparent resin, and a sixth layer of adhesive; and a card adhered to said six layer of adhesive; whereby when in use, said backing paper is first removed, and then said double-sided release paper is removed from said transparent removable film leaving said transparent removable film on said card, thereby enabling illustration of said card to be completely seen and said stickers be adhered on said removable film, and writing can also be done on said film.

* * * * *